(12) United States Patent
Generale et al.

(10) Patent No.: US 11,280,201 B2
(45) Date of Patent: Mar. 22, 2022

(54) BAFFLE WITH TAIL

(71) Applicant: UNITED TECHNOLOGIES CORPORATION, Farmington, CT (US)

(72) Inventors: Adam P. Generale, Dobbs Ferry, NY (US); Lucas Dvorozniak, Bloomfield, CT (US); San Quach, Southington, CT (US); Bryan P. Dube, Columbia, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 16/600,875

(22) Filed: Oct. 14, 2019

(65) Prior Publication Data
US 2021/0108519 A1 Apr. 15, 2021

(51) Int. Cl.
*F01D 5/18* (2006.01)
(52) U.S. Cl.
CPC ........ *F01D 5/189* (2013.01); *F05D 2260/201* (2013.01)
(58) Field of Classification Search
CPC .......... F01D 5/188; F01D 5/186; F01D 5/284; F01D 9/065; F01D 9/186; F05D 2260/201; F05D 2260/202; F05D 2260/20; F05D 2230/60; F05D 2300/6033
See application file for complete search history.

(56) References Cited

U.S. PATENT DOCUMENTS

| | | | | |
|---|---|---|---|---|
| 2,600,048 A | * | 6/1952 | Conwell | F01D 5/18 |
| | | | | 416/226 |
| 2,906,495 A | * | 9/1959 | Schum | F01D 5/188 |
| | | | | 416/92 |
| 3,767,322 A | * | 10/1973 | Durgin | F01D 9/042 |
| | | | | 416/97 R |
| 3,836,283 A | | 9/1974 | Matsuki et al. | |
| 4,297,077 A | * | 10/1981 | Durgin | F01D 5/189 |
| | | | | 416/97 R |
| 4,312,624 A | | 1/1982 | Steinbauer, Jr. et al. | |
| 4,482,295 A | | 11/1984 | North et al. | |

(Continued)

FOREIGN PATENT DOCUMENTS

| | | |
|---|---|---|
| GB | 1078116 A | 8/1967 |
| JP | S60192803 | 10/1985 |

OTHER PUBLICATIONS

The Extended European Search Report for European Patent Application No. 20199571.9 dated Mar. 16, 2021.

*Primary Examiner* — Justin D Seabe
*Assistant Examiner* — Ryan C Clark
(74) *Attorney, Agent, or Firm* — Carlson, Gaskey & Olds, P.C.

(57) ABSTRACT

An airfoil vane includes an airfoil section including an outer wall that defines an internal cavity; and a baffle situated in the internal cavity, the baffle including a baffle wall that defines a central cavity having a leading end and a trailing end corresponding to a leading end and a trailing end of the airfoil section, and a tail extending from the baffle wall, the tail including at least one feature configured to disturb an airflow surrounding the tail. A baffle for the airfoil vane assembly and a method of assembling a ceramic matrix composite airfoil vane are also disclosed.

12 Claims, 3 Drawing Sheets

(56) References Cited

U.S. PATENT DOCUMENTS

| | | | |
|---|---|---|---|
| 5,511,937 A | 4/1996 | Papageorgiou | |
| 5,533,864 A * | 7/1996 | Nomoto | F01D 5/186 |
| | | | 415/115 |
| 5,704,763 A * | 1/1998 | Lee | F01D 5/188 |
| | | | 416/96 R |
| 6,237,344 B1 * | 5/2001 | Lee | F01D 25/12 |
| | | | 60/754 |
| 8,851,844 B2 * | 10/2014 | Yamashita | F01D 5/16 |
| | | | 416/96 A |
| 9,488,066 B2 * | 11/2016 | Yamashita | F01D 25/06 |
| 9,581,028 B1 | 2/2017 | Jones et al. | |
| 9,988,913 B2 * | 6/2018 | Spangler | F01D 5/284 |
| 2002/0064452 A1 * | 5/2002 | Ciani | F01D 5/186 |
| | | | 415/115 |
| 2005/0281667 A1 | 12/2005 | Liang | |
| 2010/0247290 A1 | 9/2010 | Hada et al. | |
| 2011/0027102 A1 * | 2/2011 | Nakamata | F01D 5/186 |
| | | | 416/97 R |
| 2018/0135426 A1 * | 5/2018 | Barker | F01D 9/042 |

* cited by examiner

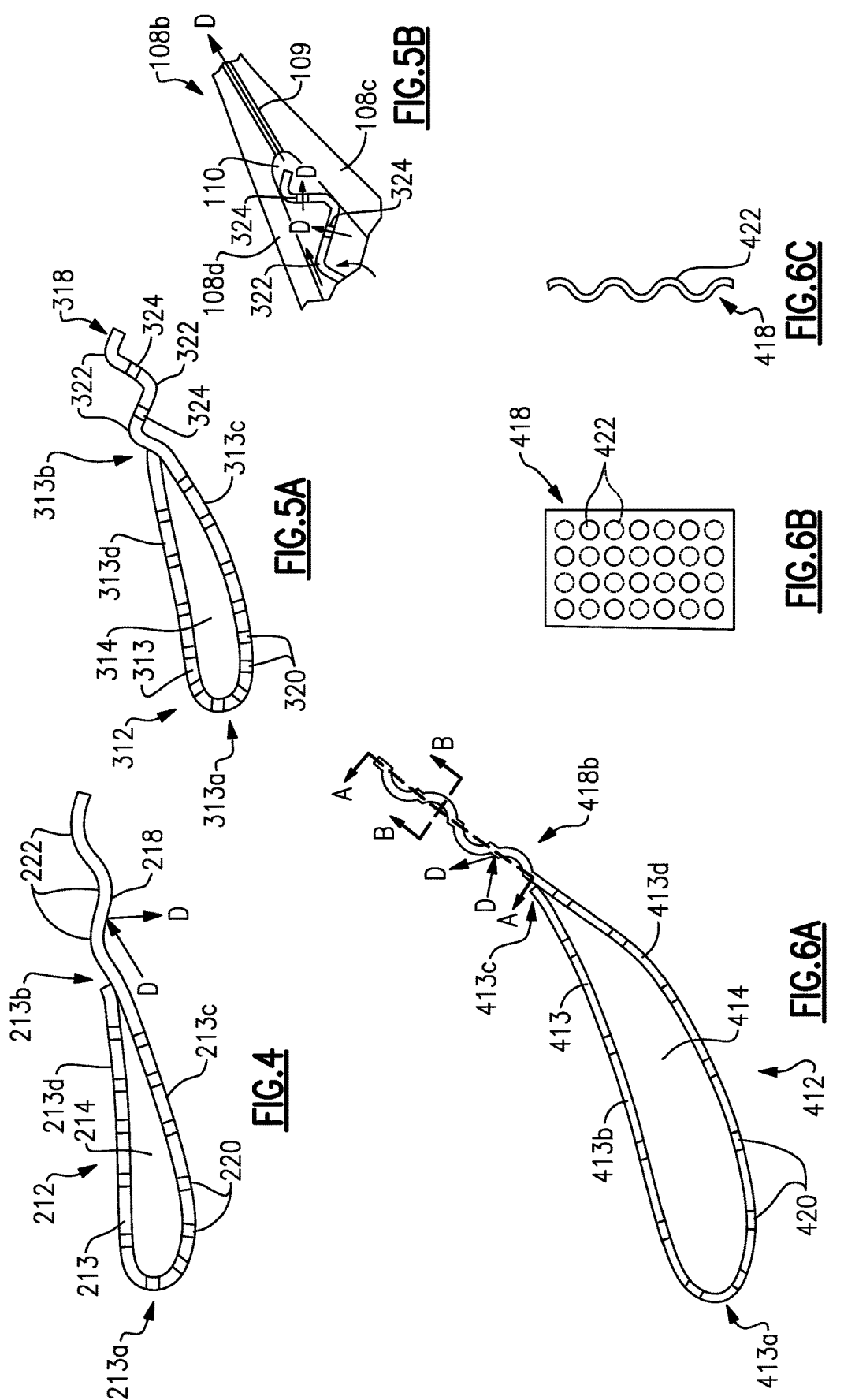

BAFFLE WITH TAIL

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Any of the fan section, the turbine section, and the compressor section include airfoils, such as for fan, compressor, or turbine blades. Baffles are known and used in cooled gas turbine engine airfoils, such as turbine vanes. Typically, a baffle is situated in a cavity in the airfoil and serves to distribute cooling air to precise locations in the airfoil.

SUMMARY

An airfoil vane according to an example of this disclosure includes an airfoil section including an outer wall that defines an internal cavity; and a baffle situated in the internal cavity, the baffle including a baffle wall that defines a central cavity having a leading end and a trailing end corresponding to a leading end and a trailing end of the airfoil section, and a tail extending from the baffle wall, the tail including at least one feature configured to disturb an airflow surrounding the tail.

In a further example of the foregoing, the internal cavity is situated near a leading end of the airfoil outer wall and the tail is situated near a trailing end of the airfoil outer wall.

In a further example of any of the foregoing, the tail has a proximal end near the main body portion of the baffle and a distal end opposite from the distal end. The distal end does not contact the airfoil outer wall.

In a further example of any of the foregoing, at least one feature includes a plurality of cooling holes.

In a further example of any of the foregoing, at least one feature includes at least one peak or trough.

In a further example of any of the foregoing, at least one feature further includes at least one cooling hole between a first peak or trough and a second peak or trough of the at least one peak or trough.

In a further example of any of the foregoing, at least one feature includes at least one dimple.

In a further example of any of the foregoing, at least one feature includes a feature selected from the group consisting of a plurality of cooling holes, at least one peak or trough, and at least one dimple.

In a further example of any of the foregoing, the airfoil outer wall is formed from a ceramic matrix composite.

In a further example of any of the foregoing, the tail is integral with the baffle wall.

A baffle for an airfoil vane assembly according to an example of this disclosure includes a baffle wall having first and second sides, and a leading end and a trailing end joining the first and second sides. The baffle wall defines a central cavity. A tail extends from the trailing end of the baffle wall. The tail includes at least one feature that is configured to disturb an airflow surrounding the tail.

In a further example of the foregoing, at least one feature includes a plurality of cooling holes.

In a further example of any of the foregoing, at least one feature includes at least one peak or trough.

In a further example of any of the foregoing, at least one feature further includes at least one cooling hole between a first peak or trough and a second peak or trough of the at least one peak or trough.

In a further example of any of the foregoing, at least one feature includes at least one dimple.

A method of assembling a ceramic matrix composite airfoil vane according to an example of this disclosure includes inserting a baffle into a central cavity of a ceramic matrix composite airfoil. The baffle includes a baffle wall that defines a central cavity which has a leading end and a trailing end corresponding to a leading end and a trailing end of the airfoil. A tail extends from the baffle wall. The tail includes at least one feature which is configured to disturb an airflow surrounding the tail.

In a further example of the foregoing, at least one feature includes a plurality of cooling holes.

In a further example of any of the foregoing, at least one feature includes at least one peak or trough.

In a further example of any of the foregoing, at least one feature further includes at least one cooling hole between a first peak or trough and a second peak or trough of the at least one peak or trough.

In a further example of any of the foregoing, at least one feature includes at least one dimple.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 4 schematically shows an example baffle for the airfoil assembly of FIGS. 2-3.

FIG. 5A-B schematically show another example baffle for the airfoil assembly of FIGS. 2-3.

FIGS. 6A-C schematically shows another example baffle for the airfoil assembly of FIGS. 2-3.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
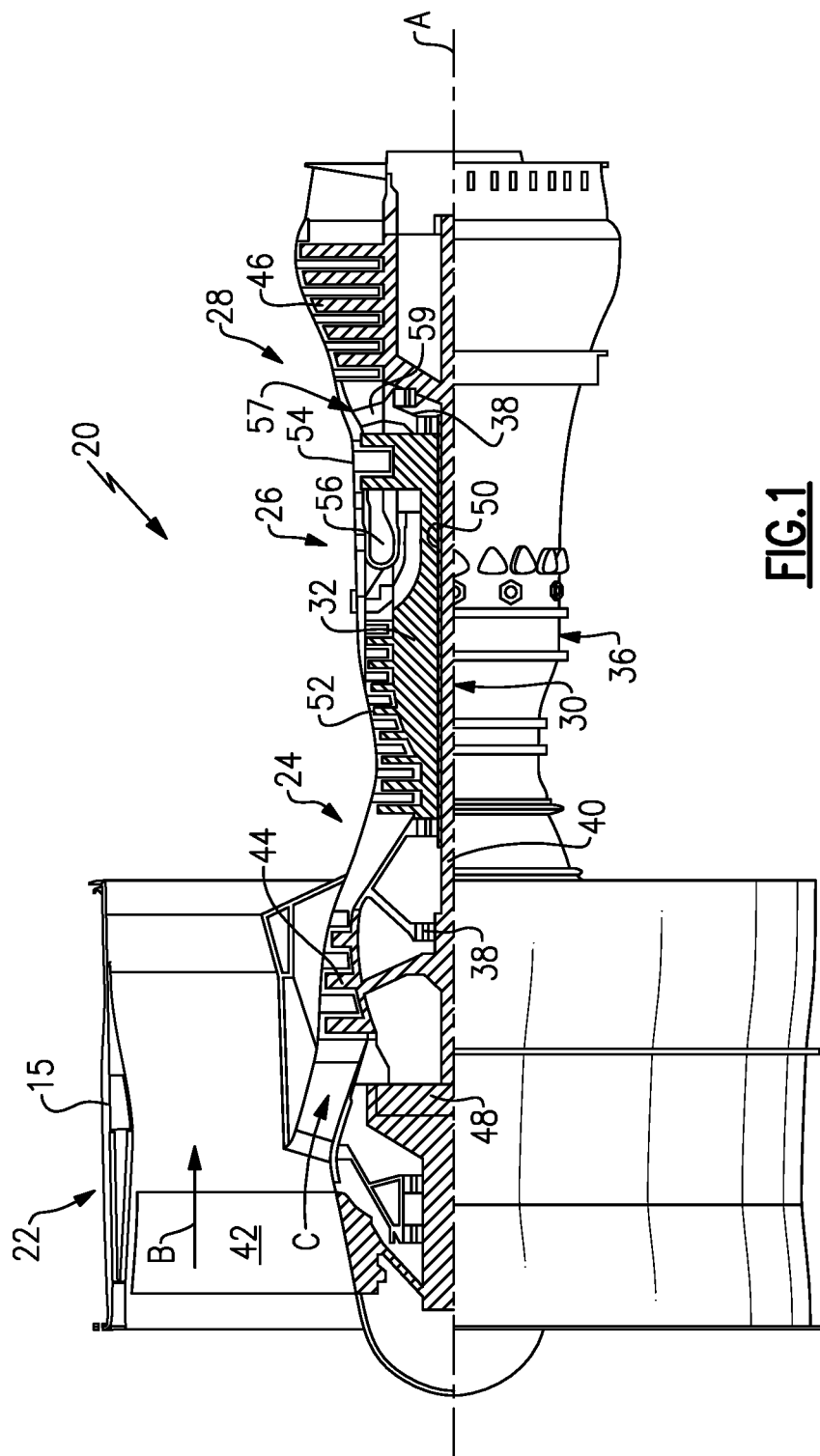
FIG. 1 schematically shows an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. Terms such as "axial," "radial," "circumferential," and variations of these terms are made with reference to the engine central axis A. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{\wedge}0.5$. The "Low corrected fan tip speed" as disclosed herein according to one non-limiting embodiment is less than about 1150 ft/second (350.5 meters/second).

Figure 2:
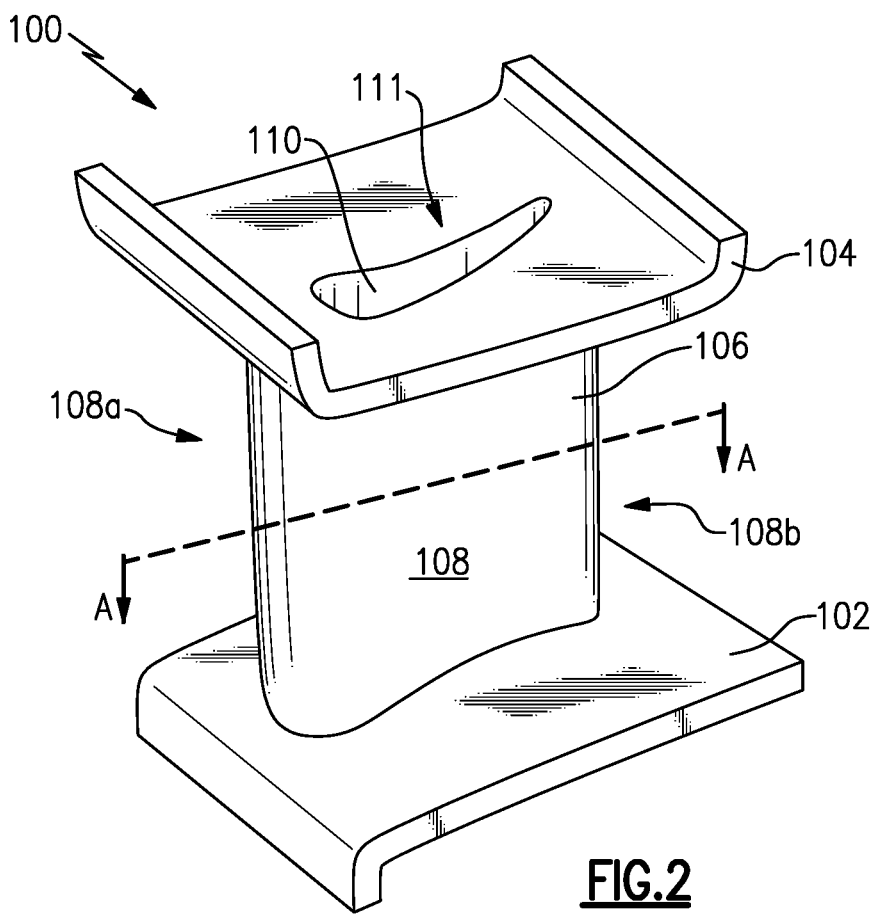
FIG. 2 schematically shows an airfoil assembly for the gas turbine engine of FIG. 1.
Figure 3:
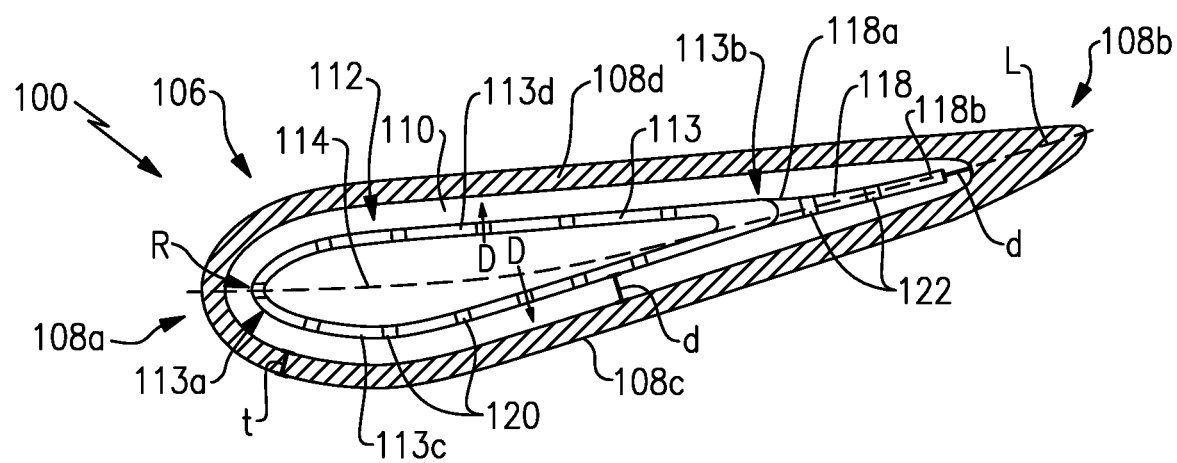
FIG. 3 schematically shows a cross-sectional view of an airfoil assembly of the airfoil assembly of FIG. 2.

FIG. 2 schematically shows an airfoil vane 100 from the turbine section 28 of the engine 20. A plurality of airfoil vanes 100 are situated in a circumferential row about the engine central axis A. The airfoil vane 100 includes a first or inner platform 102, a second or outer platform 104, and an airfoil section 106 that spans between the inner and outer platforms 102/104. FIG. 3 shows a cross-sectional view of the airfoil section 106 along the section line A-A in FIG. 2. The airfoil section 106 includes an airfoil outer wall 108 that delimits the profile of the airfoil section 106. The outer wall 108 defines a leading end 108a, a trailing end 108b, and first and second sides 108c/108d (FIG. 3) that join the leading and trailing ends 108a/108b. In this example, the first side 108c is a pressure side and the second side 108d is a suction side. The outer wall 108 circumscribes an internal cavity 110. The cavity 110 may be a single cavity or a sub-cavity, for example.

In one example, the airfoil vane 100 is formed of a ceramic material, such as a ceramic matrix composite (CMC) material. For example, the CMC includes a ceramic matrix and ceramic fibers disposed in the ceramic matrix. The ceramic matrix may be, but is not limited to, silicon carbide (SiC) and the ceramic fibers may be, but are not limited to, silicon carbide (SiC) fibers. The CMC is comprised of fiber plies that are arranged in a stacked configuration and formed to the desired geometry of the airfoil vane 100. For instance, the fiber plies may be layers or tapes that are laid-up one on top of the other to form the stacked configuration. The fiber plies may be woven or unidirectional, for example. At least a portion of the fiber plies are continuous through the platforms 102/104 and the airfoil section 106. In this regard, the airfoil vane 100 is a continuous body in that the fiber plies are uninterrupted through the platforms 102/104 and the airfoil section 106. The airfoil vane 100 may also be a monolithic ceramic material, such as a silicon-containing ceramic. Examples of such ceramics include silicon nitride and silicon carbide.

In another example, the airfoil vane 100 is formed of a metallic material.

The airfoil vane 100 also includes a baffle 112 disposed in the internal cavity 110. The baffle 112 is formed of a baffle wall 113 that has first and second sides 113c, 113d that are joined at a leading end 113a and a trailing end 113b. The baffle wall 113 defines a central cavity 114. The first and second sides 113c/113d and leading end 113a generally correspond to and tracks the shape of the sides 108c/108d and leading end 108a of the airfoil outer wall 108. However, the baffle wall 113 is spaced away from the airfoil outer wall 108 by a standoff distance d. In other words, the baffle wall 113 does not touch or contact the airfoil outer wall 108. In some examples, the standoff distance d is between about 20 and 100 mils (0.508 and 2.54 mm) near the area of the leading edge 108a of the outer wall 108. In a more particular example, the standoff distance d is between about 40 and 50 mils (1.02 and 1.27 mm) near the area of the leading edge 108a of the outer wall 108.

The baffle wall 113 includes cooling holes 120. During operation of the engine 20, the outer face of the airfoil outer wall 108 is exposed to hot combustion gases. Cooling air D such as bleed air from the compressor section 24 (FIG. 1), is provided into the internal cavity 110 of the airfoil vane 100 and to the central cavity 114 of the baffle 112. The cooling holes 120 jet the cooling air D towards the sides 108c/108d of the airfoil section 106. This jetting provides impingement cooling to the airfoil section 106.

A tail 118 extends from the trailing end 113b of the baffle wall 113 towards the trailing end 108b of the airfoil outer wall 108. In one example, the tail 118 has a radial extent that is the full or substantially full radial extent of the baffle wall 113. In another example, the radial extent of the tail 118 is less than the full radial extent of the baffle wall 113. The tail 118 includes a proximal end 118a near the trailing end 113b of the baffle wall 113 and a distal, free end 118b opposite the proximal end 118a. The distal end 118b is situated so that there is a standoff distance d between the distal end 118b and the inside surfaces of the trailing end 108b of the airfoil section 106. In some examples, the standoff distance d is between about 30 and 80 mils (0.762 and 2.03 mm).

The tail 118 serves to facilitate cooling in the trailing end 108b of the airfoil section 106 by disrupting airflow (e.g., the cooling airflow D) in the area of the trailing end 108b. In that respect, the tail 118 includes at least one feature 122 that is configured to disrupt airflow. In some examples, the disruption can include jetting the airflow, causing the airflow to change direction, and/or turbulating the airflow. In general, disruption of the airflow mixes the air to facilitate enhancement of heat transfer with the airfoil outer wall 108 in the area of the trailing end 108b due to the tail 118. Accordingly, substantially all of the airfoil outer wall 108 is cooled via the combination of the baffle wall 113 and tail 118. This in turn facilitates a reduction in thermal gradients along the airfoil outer wall 108 (e.g., reduces the formation of "hot spots"). In the example of FIG. 3, the feature 122 includes one or more cooling holes that extend through the thickness of the tail 118.

In one example, the baffle wall 113 is formed of a thin metallic material (e.g., sheet metal) bent about a radius point R to define the central cavity 114 and provide a three-dimensional shape that tracks the shape of the airfoil outer wall 108 near the area of the leading end 108a, as discussed above. On the other hand, the tail 118 extends generally in two dimensions, along a camber line L of the airfoil section 106 (FIG. 3).

The tail 118 and baffle wall 113 may be integral with one another, that is, free of any joints such as weld or braze joints. In another example, the tail 118 is attached to the baffle wall 113 by welding, brazing, or another suitable attachment method.

The baffle 112 can be inserted into a seated positon in the airfoil section 106 from an opening 111 in the outer platform 104, shown in FIG. 2. In the example of FIG. 2, the opening 111 is in the outer platform 104, but in another example, the opening can be in the inner platform 102. Once seated, the baffle 112 is then secured in place, such as to the airfoil vane 100 or another adjacent structure in the engine 20. Such an installation of the baffle 112 into the airfoil section 106 may be conducted as an initial assembly of the airfoil vane 100 or, alternatively, as part of a repair or replacement process. For example, the baffle 112 can be bolted, clamped, or otherwise joined to either of the airfoil section 106, the adjacent structures in the engine 20, or both.

FIG. 4 shows another example baffle 212. In this disclosure, like reference numerals designate like elements where appropriate and reference numerals with the addition of one-hundred or multiples thereof designate modified elements that are understood to incorporate the same features and benefits of the corresponding elements. In this example, the baffle 212 includes a baffle wall 213 and a tail 218. The baffle wall 213 has first and second sides 213c, 213d that are joined at a leading end 313a and a trailing end 313b. A central cavity 214 is defined by the baffle wall 213. The first and second sides 213c/313d and leading end 213a are shaped to generally track the shape of the sides 108c/108d and leading end 108a of the airfoil outer wall 108 (shown in FIG. 3). The baffle wall 213 is spaced away from the airfoil outer wall 108 by a standoff distance d (FIG. 3). The baffle wall 213 may include cooling holes 220, as discussed above.

In this example, the tail 218 has an undulating shape that includes multiple peaks and troughs 222. The peaks and troughs 222 do not contact the airfoil outer wall 108 (FIG. 3). Though three peaks and troughs 222 are shown in FIG. 4, additional or fewer peaks and troughs 222 may be used for a greater or lesser air-disrupting effect, subject to space considerations, and in particular, maintaining the lack of contact between the tail 218 and the airfoil outer wall 108. The peaks and troughs 222 disrupt airflow in the internal cavity 110 by forcing air cooling air D to change direction as it encounters a peaks and troughs 222, as is schematically in FIG. 4. This causes the cooling air D to speed up and/or induces turbulence in the cooling air D, which improves cooling of the outer airfoil wall 108 as discussed above.

FIGS. 5A-B show another example baffle 312. The baffle 312 includes a baffle wall 313 and a tail 318. The baffle wall 313 has first and second sides 313c, 313d that are joined at a leading end 313a and a trailing end 313b. A central cavity 314 is defined by the baffle wall 313. The first and second sides 313c/313d and leading end 313a are shaped to generally track the shape of the sides 108c/108d and leading end 108a of the airfoil outer wall 108 (shown in FIG. 3). The baffle wall 313 is spaced away from the airfoil outer wall 108 by a standoff distance d (FIG. 3). The baffle wall 313 may include cooling holes 320, as discussed above.

As shown in FIG. 5A, the example baffle 312 is similar to the example baffle 212 shown in FIG. 4 and discussed above. In this example, however, the tail 318 includes cooling holes 324 situated between the peaks and troughs 322. As above, the main body portion 316 includes cooling holes 320. FIG.

5B shows a detail view of the trailing end 108*b* of the airfoil outer wall 108. The cooling holes 324 jet cooling air D towards the sides 108*c*/108*d* of the airfoil outer wall 108 near the trailing end 108*b*, which cools the airfoil outer wall 108 in this region as discussed above. The airfoil outer wall 108 includes a passage 109 at the trailing end 108*b* through which the cooling air C escapes the internal cavity 110 of the airfoil section 106.

FIGS. 6A-C show another example baffle 412. FIG. 6B shows a section view of the baffle 412 of FIG. 6A along the section line A-A in FIG. 6A. The baffle 412 includes a baffle wall 413 and a tail 418. The baffle wall 413 has first and second sides 413*c*, 413*d* that are joined at a leading end 413*a* and a trailing end 413*b*. A central cavity 414 is defined by the baffle wall 413. In this example, the tail 418 includes one or more dimples 422. The dimples 422 are formed or pressed into the tail 418 to create three-dimensional shapes that define a surface texture. In the example of FIGS. 6A-C, the dimples 422 are semispherical, though other shapes are contemplated. Furthermore, in the example of FIGS. 6A-C, the dimples 22 are formed in an alternating arrangement in which adjacent dimples 422 are pressed into opposite sides of the tail 418, though other arrangements are also contemplated. The dimples 422 disrupt airflow in the internal cavity 110 by forcing air cooling air D to change direction as it encounters a dimple 422, as is schematically in FIG. 6. This causes the cooling air D to speed up and/or induces turbulence in the cooling air D, which improves cooling of the outer airfoil wall 108 as discussed above.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An airfoil vane, comprising:
   an airfoil section including an outer wall that defines an internal cavity; and
   a baffle situated in the internal cavity, the baffle including a baffle wall that defines a central cavity having a leading end and a trailing end corresponding to a leading end and a trailing end of the airfoil section and tracking the shape of the airfoil outer wall, and a tail extending from the baffle wall, the tail including at least two peaks and at least one trough between the two peaks, the peaks and trough configured to disturb an airflow surrounding the tail, wherein the peaks and trough do not contact the outer wall of the airfoil section, and wherein the baffle wall and the tail are formed from the same piece of metal, and the leading end corresponds to a bend in the piece of metal.

2. The airfoil vane of claim 1, wherein the internal cavity is situated near a leading end of the airfoil outer wall and the tail is situated near a trailing end of the airfoil outer wall.

3. The airfoil vane of claim 1, wherein the at least one feature further includes at least one cooling hole between a first peak or trough and a second peak or trough of the at least one peak or trough.

4. The airfoil vane of claim 1, wherein the airfoil outer wall is formed from a ceramic matrix composite.

5. The airfoil vane of claim 1, wherein the tail is integral with the baffle wall.

6. A method of assembling a ceramic matrix composite airfoil vane, comprising:
   inserting a baffle into a central cavity of a ceramic matrix composite airfoil, the baffle including a baffle wall that that tracks the shape of the airfoil and defines a central cavity having a leading end and a trailing end corresponding to a leading end and a trailing end of the airfoil, and a tail extending from the baffle wall, the tail including at least two peaks and at least one trough between the two peaks, the peaks and trough configured to disturb an airflow surrounding the tail, wherein the peaks and trough do not contact the ceramic matrix composite airfoil, and wherein the baffle wall and the tail are formed from the same piece of metal, and the leading end corresponds to a bend in the piece of metal.

7. The method of claim 1, wherein the tail further includes at least one cooling hole between a first peak or trough and a second peak or trough of the at least one peak or trough.

8. The baffle of claim 6, wherein the tail includes at least three peaks and at least two troughs alternating with the at least three peaks.

9. A method of making a baffle for an airfoil vane, comprising: bending a piece of metal to define a baffle wall and a tail, wherein the baffle wall tracks the shape of an airfoil and defines a central cavity having a leading end and a trailing end, the leading end corresponding to the bend in the piece of metal, and wherein the tail includes at least two pea and at least one trough between the two peaks, wherein the baffle is configured to be placed in an airfoil section of the airfoil vane that includes an outer wall which defines an Internal cavity, and the at least two peaks and at least one trough of the tail are configured to not contact the outer wall of the airfoil vane when placed in the internal cavity, the peaks and trough configured to disturb an airflow surrounding the tail.

10. The method of claim 9, wherein the piece of metal is a piece of sheet metal.

11. The method of claim 9, further comprising forming at least one cooling hole between a first peak or trough and a second peak or trough of the at least one peak or trough.

12. The method of claim 9, wherein the tail includes at least three peaks and at least two troughs alternating with the at least three peaks.

* * * * *